Dec. 17, 1968    B. H. NAGAMATSU    3,416,626
GROUND EFFECT VEHICLE

Filed March 9, 1967    3 Sheets-Sheet 1

Inventor:
Brian H. Nagamatsu

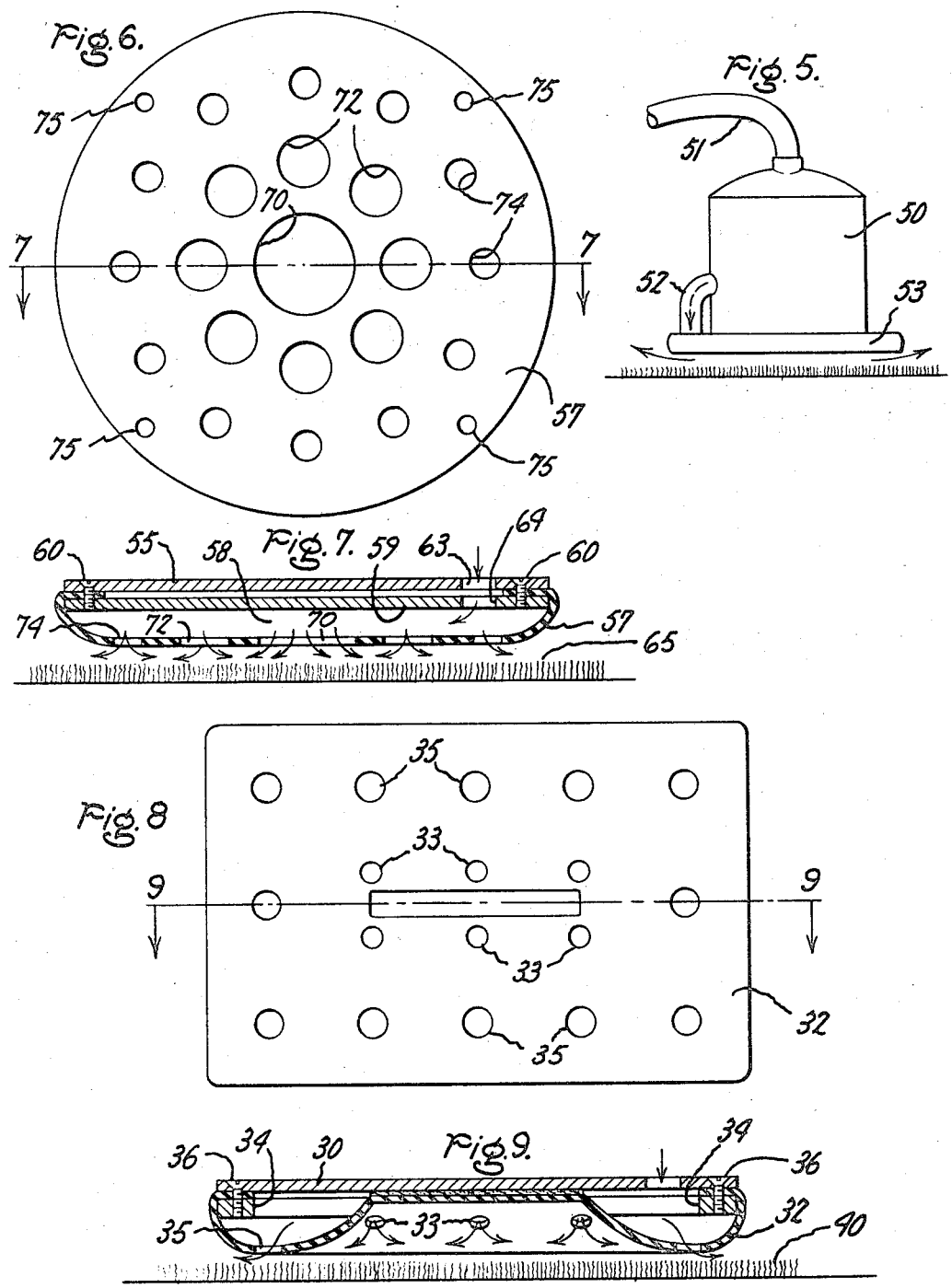

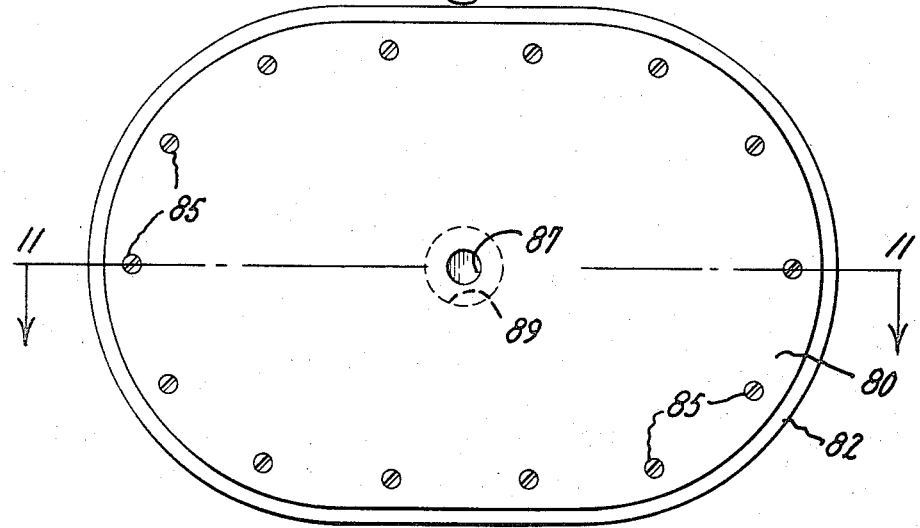
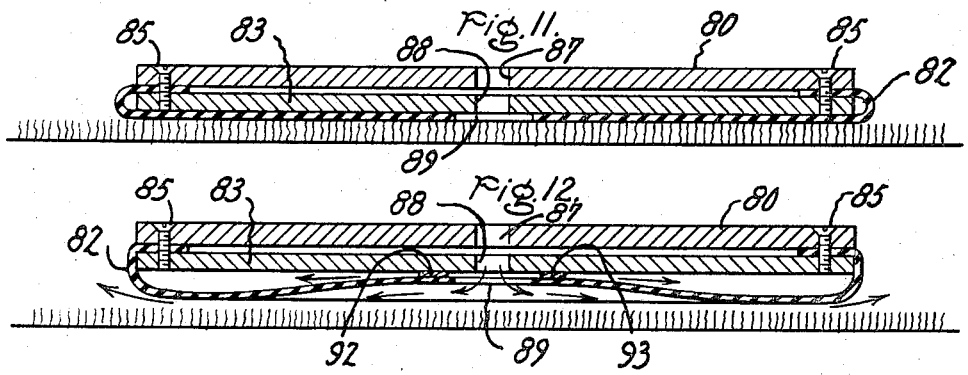
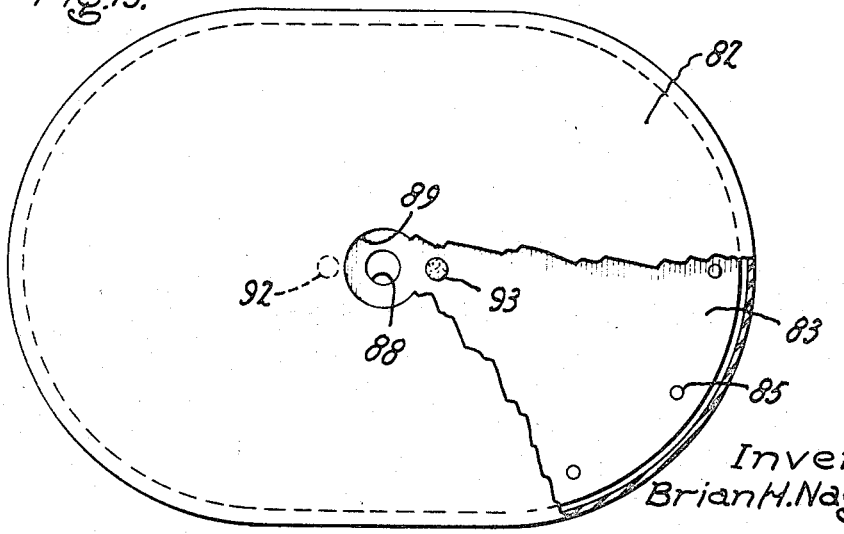

United States Patent Office 3,416,626
Patented Dec. 17, 1968

3,416,626
GROUND EFFECT VEHICLE
Brian H. Nagamatsu, 1046 Cornelius Ave.,
Schenectady, N.Y. 12309
Filed Mar. 9, 1967, Ser. No. 621,861
1 Claim. (Cl. 180—124)

ABSTRACT OF THE DISCLOSURE

The invention centers in the new concept of using a low-pressure gas source in combination with a thin, light-weight inflatable bag designed to discharge air continuously to produce a ground-effect, hover or lifting action.

The present invention relates, generally, to the air-cushion art and is more particularly concerned with the novel ground-effect vehicle having unique characteristics of performance, particularly as a skim-board or as a domestic vacuum cleaner hover support useful over both carpeted and uncarpeted hard surfaces.

A variety of types and sizes of ground-effect machines and air-cushion devices have been developed and disclosed in the prior art for widely different purposes. Some of them, intended for use in lifting relatively small and light loads such as kitchen ranges, domestic refrigerators and vacuum cleaners, are designed to operate on relatively low gas pressure of the order of 5 p.s.i. gauge pressure. They are typically designed for operation in combination with domestic vacuum cleaners, the exhaust air flow of a conventional canister-type cleaner being sufficient in volume and pressure to produce the desired hover effect under certain conditions over a hard, impervious floor surface but not over a cork or a carpeted floor. It is indicated in the prior art, however, that by approximately doubling the volume of air flow to the lifting element, the desired hover effect could be obtained over a carpeted surface providing that the load is not substantially increased beyond that which can be supported by the unmodified device over a hard surface.

By virtue of my present invention, predicated upon my discoveries subsequently to be described, it is possible, for the first time to my knowledge, to obtain this hover effect over carpeted surfaces with loads up to 100 pounds in weight without more than the exhaust air output of a conventional domestic vacuum cleaner. Moreover, this result can be realized through a construction which is both substantially lighter in weight and less expensive and complicated to manufacture than the prior art devices. Consequently, it is now possible to build, at low cost, a skim-board on which a person can ride either indoors or outdoors over a variety of types of surfaces and without need for supplementary gas pressure or air-blowing equipment. Also, hassock-type vacuum cleaners can be provided with a hover support operating solely on the exhaust of the cleaner so that the cleaner and its hover attachment are lifted and maintained slightly above carpeted floor surfaces.

In making this invention, I made the discovery that a thin (suitably from 3 to 10 mils uniform thickness), stretchable bag similar to a toy balloon, although larger and having an opening in its lower side for the escape of air, can be inflated by a low-pressure gas source and used in that condition to support relatively heavy weights in a stable hovering state in close proximity to the ground or floor. I also found, contrary to expectation, that this result could be obtained over carpeted surfaces which have presented a special problem for ground-effect machines of the prior art met only by providing substantial supplementary blowing capacity.

I further discovered that the number and arrangements of openings in the air bag are not critical, although stability can be improved by multiplying the air exhaust openings and distributing them in a generally regular, geometric pattern reaching near the periphery of the bag lower surface. However, the size, number and arrangement or distribution of these exhaust openings are largely matters of choice, the important requirement being the continuous flow of air in sufficient volume to maintain the bag inflated and also provide a flow of air through the bag openings to produce the ground-effect or hover conditions desired. There may be but a single exhaust opening. However, it will be necessary that it be located near or at the geometric center of the bag bottom surface so that the assembly can be stabilized during the hover attitude. If the inlet opening through which air is delivered during operation to the bag is located in substantial axial alignment with the single exhaust opening, the latter opening will necessarily be about twice the diameter of the inlet opening. But if these openings are not aligned, the exhaust opening will necessarily be relatively much larger as about eight times the diameter of the inlet opening, for reasons to be described.

Still further, I found that the air bag can advantageously be in the form of a bubble or half balloon with a thin and stretchable portion being in the form of a flat sheet secured gas-tightly around its periphery to a rigid support structure which then forms the upper side of the bag assembly and serves as the load-engaging support of the assembly.

Those skilled in the art will gain a better understanding of this invention from the following detailed description of it in preferred forms, reference being had to the drawings accompanying and forming a part of this specification, in which:

FIG. 5 is a side elevational view of a vacuum cleaner equipped with an air-cushion device of this invention and hovering above a carpeted floor;

FIG. 6 is a bottom plan view of the apparatus of FIG. 5;

FIG. 7 is a transverse, sectional view of the air-cushion attachment of the vacuum cleaner of FIG. 5 showing air-flow patterns as the device is in hovering attitude;

FIG. 8 is a bottom plan view of still another air-cushion device embodying this invention;

FIG. 9 is a sectional view of the apparatus of FIG. 8 taken on line 9—9;

FIG. 10 is a top plan view of still another device embodying this invention;

FIG. 11 is a sectional view taken on line 11—11 of FIG. 10;

FIG. 12 is a sectional view similar to that of FIG. 11 showing the device in operation; and FIG. 13 is a bottom plan view of the FIG. 10 device, part of the diaphragm being broken away for purposes of illustration.

Figure 1:
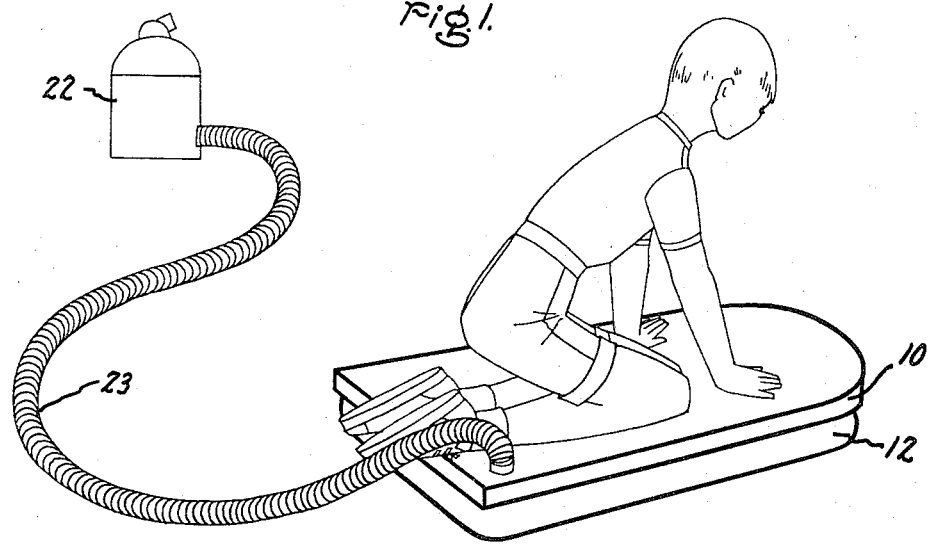
FIG. 1 is a perspective view of a skim-board of this invention in typical use.
Figure 2:
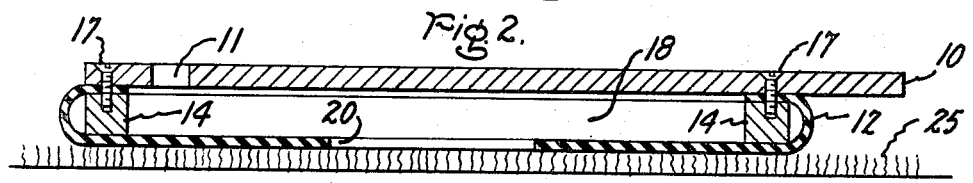
FIG. 2 is a sectional view taken along the longitudinal center line of the skim-board of FIG. 1 at rest on a carpeted floor.

Briefly described, a vehicle of this invention comprises a rigid support to which is gas-tightly secured a flexible diaphragm to define a plenum chamber on the bottom side of the support. The vehicle also includes means including a gas inlet port formed in the support to connect the plenum chamber to a low pressure gas source. The diaphragm is of gas impermeable sheet material and is provided with an opening for gas flow from the plenum chamber downwardly whereby the vehicle is elevated and maintained in close vertical spaced relation to the floor to hover and travel without contact with the floor while gas is continuously delivered into and discharged from the plenum chamber. A special novel feature of this vehicle is the very lightweight, thin, flexible and inflatable diaphragm which is of thickness from about 3 to 10 mils.

The apparatus illustrated in FIGS. 1–4 comprises a generally rectangular platform 10 of one-half inch plywood construction having a rounded leading edge portion and an overall length of 33 inches and a width of 22 inches. An opening 11 of 1½ inch diameter is provided near a rear corner of platform 10 for purposes subsequently to be described. The edge portions of a rectangular 10-mil polyethylene sheet 12 are gripped against the peripheral portions of the lower side of platform 10 by means of 1⅛ inch sectional pine rib 14 secured to platform 10 by means of a plurality of countersunk screws 17. A plenum chamber 18 is thus provided under the major portion of platform 10. A central opening 20, 11 inches in diameter, is formed in sheet 12 for air or gas flow from chamber 18.

Figure 3:
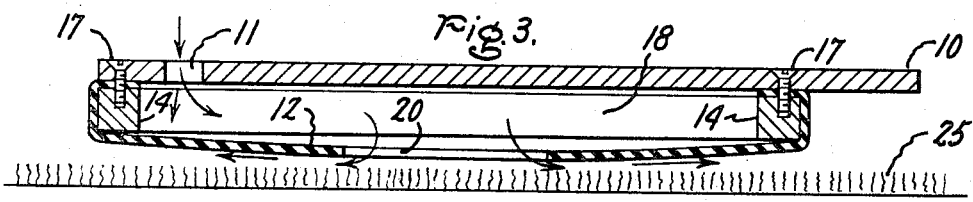
FIG. 3 is a view like FIG. 2 showing the skim-board in hovering attitude.
Figure 4:
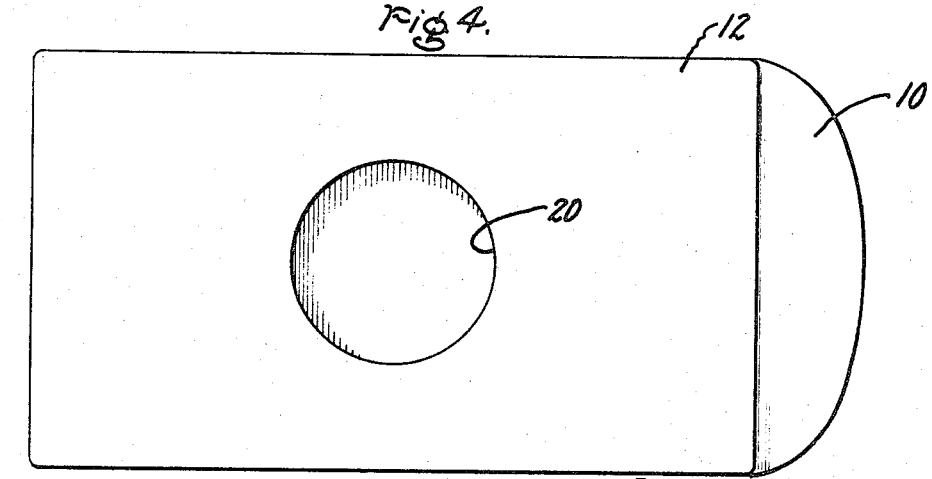
FIG. 4 is a bottom plan view of the skim-board of FIG. 1.

A conventional cylindrical upright domestic vacuum cleaner 22 is connected by hose 23 to platform 10 so that air flowing through hose 23 enters chamber 18 through opening 11. With a passenger in position on platform 10 as shown in FIG. 1 and with vaccum cleaner 22 operating, air flowing into the plenum chamber will inflate sheet 12 as shown in FIG. 3 and will flow continuously from the chamber through opening 20, thereby lifting the load and platform and the skim-board assembly into a position slightly above carpeted floor 25. As the skim-board hovers, it can easily be caused to move about within an area limited by the length of hose 23.

The device illustrated in FIGS. 8 and 9 is similar to that shown in FIGS. 1–4, differing primarily in the number of exhaust openings formed in the flexible diaphragm and in the actual form of diaphragm as it is mounted on the supporting structure. This skim-board vehicle comprises three principal parts as in the foregoing case, namely rigid platform 30 which is rectangular in shape, plastic sheet 32 of three mils thickness which constitutes the flexible diaphragm element when it is secured around its edges to the under side of platform 30 and sectional rib 34. Countersunk screws 36 serve to hold these parts in assembled relation as described above. Diaphragm 32 is also secured to platform 30 along a 9-inch length of the longitudinal medial line of the platform as shown to best advantage in FIG. 8, being attached by resin cement so that these parts are permanently bonded tightly together. Diaphragm 32 is also provided with a total of 18 discharge openings, of which six centrally located ones 33 are 1⅛ inch in diameter while the remaining ones 35 distributed uniformly in a rectangular pattern on about 5-inch centers from the edge of the board are of 1¾ inch diameter.

As illustrated in FIG. 9, in operation the skim-board hovers in a manner similar to that of the skim-board of FIG. 1, having, however, greater stability because of the number of openings through which air flows from the plenum chamber to elevate the assembly above the carpeted floor 40. Again, however, a vacuum cleaner such as cleaner 22 may be employed in using this vehicle and the weight-supporting capacity of the vehicle will approximate that of the vehicle of FIG. 1.

The air-cushion vehicle illustrated in FIGS. 5, 6 and 7 includes a conventional domestic vaccum cleaner 50 having an inlet hose 51 and an outlet hose connection 52. Cleaner hover support and air-cushion assembly 53 is secured to the bottom of the cleaner as shown in FIG. 5. Assembly 53 is generally like the vehicle structures described in reference to FIGS. 1 and 8 comprising a rigid circular plywood platform 55 and a plastic diaphragm 57 in the form of a 5-mil polyethylene sheet secured around its edges to the peripheral portions of the under surface of platform 55 by means of a gripper board 59 of the same size and shape as platform 55, countersunk screws 60 being used to hold these parts in assembled relation, as indicated in FIG. 7. Platform 55 and gripper board 59 are provided with registered openings 63 and 64, respectively, to receive air flow from cleaner 50 through exhaust outlet connection 52. Air thus entering plenum chamber 58 in this manner is continuously discharged against carpeted floor 65, producing the hovering effect as shown in FIG. 7, flexible diaphragm 57 being fully inflated during operation of the device in this manner. The air flow from plenum chamber 58 is simultaneous through the plurality of the discharge openings formed in diaphragm 57. There is, as shown in FIG. 6, a central discharge opening 70 four inches in diameter and two symmetrically arranged rings of openings around the central port and uniformly spaced between the center and the periphery of the flexible diaphragm. The eight ports 72 of the inner ring are each of 2-inch diameter and the 12 ports 74 of the outer ring are each of 1¾ inch diameter. Additonally, four anti-resonance ports 75 of 0.7 inch diameter are disposed outside the outer port ring describing in outline a rectangular figure. As in the cases of the vehicles illustrated in FIGS. 1 and 8, the device of FIG. 5 floats in stable attitudes illustrated in FIG. 7 as long as the vacuum cleaner is operated, thus enabling the cleaner to be moved about with very little pulling or pushing force and no lifting effort over both carpeted and hard surfaces.

The increased stability in operation afforded the FIG. 8 device by attaching a short length of the central portion of diaphragm 32 to platform 30 is not provided in the FIG. 7 apparatus upon which the load is fixed in centered position so that there is little tendency for wobble to develop as the assembly is moved about in hovering attitude.

The device of FIGS. 10–13 is in general like those described above in construction and mode of operation, differing principally in both respects as illustrated in FIG. 12. Thus, the three main parts of the device are a plywood platform 80, a polyethylene diaphragm 82 and a plywood gripper board 83 of the same generally oval (in plan) shape and size as platform 80. Countersunk screws 85 hold platform 80 and board 83 in closely-spaced relation with the periphery of 5-mil thick diaphragm gripped between them and with their 1½ inch diameter central inlet openings 87 and 88 in register with 3½ inch diameter discharge openings 89 in the plastic diaphragm. As shown in FIG. 13, diaphragm 82 is attached to board 83 at two points 92 and 93 adjacent to discharge opening 89 by means of adhesive for a purpose to be described.

The devices of FIGS. 1, 7, 9 and 10 all are operable on the output air flow from any conventional domestic vacuum cleaner and consequently they may be used with any other air or gas pressure source capable of delivering a substantially constant volume and velocity of flow approximating from 42 to 48 cubic feet per minute. Larger vehicles and greater weights than the 100 pound loads stated above can be handled with greater blowing capicities but this will require higher gas pressures in the plenum chamber than the 0.1 to 0.3 p.s.i. gauge pressures maintained in the illustrated devices of this invention. Also, it is possible to operate some of these present invention devices, such as those of FIGS. 1-4 and FIGS. 10-13, on blowing capacities somewhat lower as about 20 to 30 cubic feet per minute, plenum chamber pressure being about 0.1 p.s.i. gauge.

While devices of this invention differ from each other in design and construction in substantial respects, they all have in common the unique characteristics of function and performance described above. Thus, for example, the total plenum chamber discharge opening area is far greater in the apparatus of FIGS. 6 and 7 than in that of FIG. 10. Similarly, the plenum chamber air pressure during operation is substantially greater in the device of FIGS. 6 and 7 than in that of FIG. 10 for a given load. In other words, it is a matter of gas pressure multiplied by the load-bearing area which determines or limits the load supported. Further, the pressure within the plenum chamber determines the relative flexibility of the plastic diaphragm and consequently the nature of air flow patterns between the diaphragm and the floor surface and the extent of effective throttling of air flow through the plenum chamber discharge openings or parts. There is substantial throttling in the cases of the FIGS. 1, 7 and 9 devices because of the close spacings of the openings in the diaphragm and the floor during operation. Thus, a lifting effect, which is self-regulating, is exerted against the under surface of the diaphragm by air flowing from the plenum chamber in a substantially uniform 360° pattern under the device and its load, the center of gravity of which is located approximately over the geometrical center of the diaphragm. In the case of the FIG. 10 device, however, the throttling effect is applied or developed at inlet openings 87-88, because diaphragm opening 89 is located adjacent to the under surface of support 83 and at a substantial vertical distance from the floor, as shown in FIG. 12.

The principal difference between the FIG. 10 device and the other illustrated embodiments of my present invention is that instead of the diaphragm discharge opening being in the portion or parts of the plastic sheet closest to the floor, it is removed vertically and the air discharged from opening 89 is partially trapped or confined under the central dome-like contour of diaphragm 82, providing an air cushion lifting or supporting effect. Stability and prompt lifting response are obtained in this design by securing means 92 and 93 which are an optional but preferred feature without which there may be an objectionable tendency for the diaphragm to flutter and provide limited lifting action particularly during the start-up operation.

Having thus described this invention in such full, clear, concise and exact terms as to enable any person skilled in the art to which it appertains to make and use the same, and having set forth the best mode contemplated of carrying out this invention, I state that the subject matter which I regard as being my invention is particularly pointed out and distinctly claimed in what is claimed.

What I claim as new and desire to secure by Letters Patent of the United States is:

1. A ground effect vehicle for use with a low-pressure gas source comprising a rigid support, a flexible and inflatable diaphragm gas-tightly secured around its periphery to the support to define a plenum chamber on the bottom of the support and having an annular portion of nearest proximity to a floor surface during operation of the vehicle, and means including a gas inlet port formed in the support for connecting the chamber to a low-pressure gas source, said diaphragm being of gas-impermeable stretchable sheet material of thickness from 3 to 10 mils and having its central portion permanently bonded to the rigid support and having a minor portion of discharge opening area in the form of a plurality of openings spaced uniformly around the central portion of the diaphragm and a major portion of discharge opening area in the form of openings spaced around the perimeter of the annular portion of the diaphragm of nearest proximity to the floor surface for gas flow from the chamber toward the floor surface whereby the vehicle is elevated and maintained in close vertical spaced relation to the floor surface to hover and travel without contact with the said surface as gas is continuously delivered into the plenum chamber in which a gas pressure of 0.1 to 0.3 p.s.i. gauge is maintained during such operation.

References Cited

UNITED STATES PATENTS

| 3,261,177 | 7/1966 | Amann et al. |
| 3,276,222 | 10/1966 | Hutchinson. |
| 3,321,038 | 5/1967 | Mackie et al. |

A. HARRY LEVY, *Primary Examiner.*

U.S. Cl. X.R.

180—128